C. W. OSTRANDER.
ADJUSTABLE CASTER.
APPLICATION FILED DEC. 15, 1919.
1,333,441.
Patented Mar. 9, 1920.
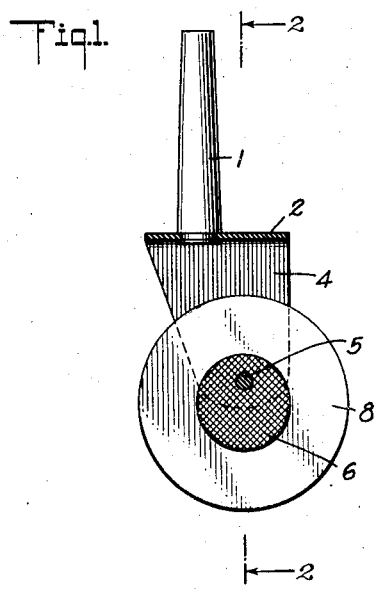
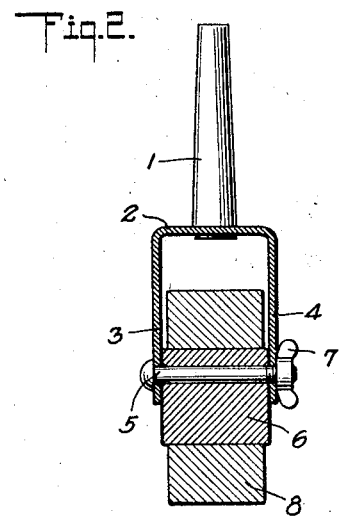
WITNESSES
Frederick Diehl.
A. L. Kitchin.
INVENTOR
Charles W. Ostrander.
BY
ATTORNEYS

UNITED STATES PATENT OFFICE.

CHARLES WILLIAM OSTRANDER, OF WINSTED, CONNECTICUT.

ADJUSTABLE CASTER.

1,333,441.　　　　　Specification of Letters Patent.　　Patented Mar. 9, 1920.

Application filed December 15, 1919. Serial No. 344,892.

*To all whom it may concern:*

Be it known that I, CHARLES W. OSTRANDER, a citizen of the United States, and a resident of Winsted, in the county of Litchfield and State of Connecticut, have invented a new and useful Adjustable Caster, of which the following is a full, clear, and exact description.

This invention relates to casters, and has for an object to provide an improved construction in which the usual caster effect is secured and at the same time means are presented which may be adjusted for producing a variation of height of the caster.

Another object in view, more specifically, is the provision of a caster with a bearing member capable of adjustment for raising and lowering the wheel of the caster in order to level up an object on which the caster is placed.

In the accompanying drawing:

Figure 1 is a longitudinal vertical section through a caster disclosing an embodiment of the invention.

Fig. 2 is a transverse sectional view through Fig. 1 on line 2—2.

Referring to the accompanying drawing by numerals, 1 indicates a pintle which acts as a journal member. This pintle is designed to be placed into a socket when the caster is in use, said pintle being riveted or otherwise rigidly secured to a U-shaped yoke 2, said yoke being formed with depending and somewhat resilient sides 3 and 4 having apertures therein near the bottom. A shaft 5, preferably in the form of a bolt, is passed through the apertures in the sides 3 and 4 and through an eccentrically positioned aperture in bearing member 6. A nut 7, preferably of the winged type, is mounted on the bolt 5 so as to firmly clamp the sides 3 and 4 against the bearing member 6 for preventing any turning thereof under ordinary conditions. To assist this rigid clamping action the ends of the bearing member 6 are knurled or roughened over the entire face. The bearing member 6 is cylindrical, but the aperture through which the bolt 5 passes is arranged eccentrically therewith while the roller 8 mounted on the bearing member 6 may freely rotate around the cylindrical bearing member or shaft, but said bearing member or shaft may be rotated on the bolt 5 to produce a vertical adjustment of the wheel 8. This is very desirable in some instances when the caster is used on furniture. In many dwellings the floor, when settling, becomes uneven and if all the casters were the same height the furniture would tilt as it would rest on three casters instead of four. To obviate this it is customary to place a small article under one of the casters in order to level up the support for the article, as for instance a bureau. By providing the eccentrically positioned bearing member 6 any unevenness of the floor may be taken up by loosening the nut 7, turning the bearing member 6 and then tightening the nut 7. It is also evident that the casters could be used for other purposes as for instance raising or lowering the level of an article.

What I claim is:

1. A caster comprising a casing provided with means for connection with a suitable socket, a wheel, and means for adjustably mounting said wheel in said casing so as to vary the effective height of the caster.

2. A caster of the character described comprising a casing having a pair of sides, a wheel arranged between said sides, and an eccentrically mounted bearing member for the wheel connected with said sides.

3. A caster comprising a casing having a pair of comparatively resilient sides, a wheel arranged between said sides, an eccentrically mounted bearing for said wheel, and means for clamping the sides against said bearing so as to prevent rotation of the bearing under normal condition.

4. A caster comprising a pair of comparatively resilient sides, a wheel arranged between said sides, a bearing member for said wheel having an eccentrically positioned opening therethrough, and a bolt extending through said side and through said opening, said bolt acting to clamp the bearing member in any adjusted position.

5. A caster of the character described formed with a casing having a pair of depending resilient sides, a wheel arranged between said sides, a bearing for said wheel having an eccentric opening therein, said bearing also having roughened ends, and a clamping bolt extending through said sides and through said opening for rigidly clamping the sides against said ends so as to lock the bearing in any adjusted position.

CHAS. WILLIAM OSTRANDER.